US010553098B2

(12) United States Patent
Hart et al.

(10) Patent No.: US 10,553,098 B2
(45) Date of Patent: Feb. 4, 2020

(54) APPLIANCE DEVICE INTEGRATION WITH ALARM SYSTEMS

(71) Applicant: Ooma, Inc., Palo Alto, CA (US)

(72) Inventors: Douglas E. Hart, San Jose, CA (US); Tobin E. Farrand, Burlingame, CA (US); David A. Bryan, Cedar Park, TX (US)

(73) Assignee: Ooma, Inc., Sunnyvale, CA (US)

( * ) Notice: Subject to any disclaimer, the term of this patent is extended or adjusted under 35 U.S.C. 154(b) by 0 days.

(21) Appl. No.: 14/327,163

(22) Filed: Jul. 9, 2014

(65) Prior Publication Data

US 2016/0012702 A1 Jan. 14, 2016

(51) Int. Cl.
*G08B 17/00* (2006.01)
*G08B 21/18* (2006.01)

(52) U.S. Cl.
CPC .................................... *G08B 21/18* (2013.01)

(58) Field of Classification Search
CPC ...................................................... G08B 21/18
See application file for complete search history.

(56) References Cited

U.S. PATENT DOCUMENTS 5,323,444 A * 6/1994 Ertz ........................ H04M 3/51 379/245
5,425,085 A 6/1995 Weinberger et al.
5,463,595 A 10/1995 Rodhall et al.
5,519,769 A 5/1996 Weinberger et al.
5,596,625 A * 1/1997 LeBlanc ................ G08B 25/14 455/404.2
5,598,460 A * 1/1997 Tendler .................. H04M 11/04 455/404.2
5,775,267 A 7/1998 Hou et al.
5,796,736 A 8/1998 Suzuki (Continued)

FOREIGN PATENT DOCUMENTS

CA 2949211 C 2/2019
EP 3050287 B1 12/2018

(Continued)

OTHER PUBLICATIONS

Lief Alert—Protection at Home, Nov. 27, 2012.*

(Continued)

*Primary Examiner* — Quang Pham
(74) *Attorney, Agent, or Firm* — Carr & Ferrell LLP

(57) ABSTRACT

Systems, methods, and software for allowing interaction between consumer appliance devices and security systems are provided herein. An exemplary method may include allowing various interactions of a user with a consumer appliance device to generate n signal, such as a panic signal, causing various forms of security systems to escalate the signal to obtain help. Another exemplary method involves allowing the device, when placing the panic signal, to involve back end systems related to the security system to provision access to an emergency service provider (i.e., 911 provider) "just in time," eliminating the need for costly pre-provisioning. Another exemplary method involves various sensors of the security system to communicate with consumer appliance devices to improve the performance, usability, or efficiency of the consumer appliance device or related systems.

23 Claims, 8 Drawing Sheets

START
Receive Panic Signal 610
Attempt to Contact User 620
Was User Reached? 630
NO
Connect PSAP to Announcement Server 640
YES
Confirm Panic? 650
YES
Connect User to PSAP 660
NO
Cancel Emergency Process 670
END

(56) References Cited

U.S. PATENT DOCUMENTS 5,991,301 A 11/1999 Christie
5,999,611 A 12/1999 Tatchell et al.
6,023,724 A 2/2000 Bhatia et al.
6,104,711 A 8/2000 Voit
6,128,481 A * 10/2000 Houde .................... H04W 4/90 455/404.2
6,148,190 A * 11/2000 Bugnon .................. H04W 4/90 455/404.1
6,201,856 B1 * 3/2001 Orwick ................ H04Q 3/0029 379/40
6,202,169 B1 3/2001 Razzaghe-Ashrafi et al.
6,266,397 B1 * 7/2001 Stoner ................... H04M 3/005 379/37
6,282,574 B1 8/2001 Voit
6,298,064 B1 10/2001 Christie
6,304,572 B1 10/2001 Christie
6,377,938 B1 4/2002 Block et al.
6,452,932 B1 9/2002 Christie
6,463,052 B1 10/2002 Christie
6,473,429 B1 10/2002 Christie
6,487,197 B1 11/2002 Elliott
6,577,638 B1 6/2003 Tashiro et al.
6,594,246 B1 7/2003 Jorgensen
6,615,264 B1 9/2003 Stoltz et al.
6,633,561 B2 10/2003 Christie
6,661,340 B1 12/2003 Saylor et al.
6,665,429 B1 12/2003 Christie
6,690,932 B1 * 2/2004 Barnier ............... H04M 3/5233 379/45
6,697,358 B2 2/2004 Bernstein
6,714,545 B1 3/2004 Hugenberg et al.
6,778,517 B1 8/2004 Lou et al.
6,778,528 B1 8/2004 Blair et al.
6,781,983 B1 8/2004 Armistead
6,914,900 B1 7/2005 Komatsu et al.
6,934,258 B1 8/2005 Smith et al.
7,113,090 B1 * 9/2006 Saylor ............. G08B 13/19682 340/5.33
7,124,506 B2 10/2006 Yamanashi et al.
7,127,043 B2 10/2006 Morris
7,127,506 B1 10/2006 Schmidt et al.
7,154,891 B1 12/2006 Callon
7,295,660 B1 11/2007 Higginbotham et al.
7,342,925 B2 3/2008 Cherchali et al.
7,376,124 B2 5/2008 Lee et al.
7,394,803 B1 7/2008 Petit-Huguenin et al.
7,599,356 B1 10/2009 Barzegar et al.
7,733,850 B1 6/2010 Croak et al.
7,733,859 B2 6/2010 Takahashi et al.
7,844,034 B1 * 11/2010 Oh ....................... H04M 3/5116 370/261
8,098,798 B2 * 1/2012 Goldman ............ H04M 3/2218 379/207.15
8,140,392 B2 3/2012 Altberg et al.
8,180,316 B2 * 5/2012 Hwang .................. H04M 11/04 379/111
8,208,955 B1 * 6/2012 Nelson ................ H04M 1/2535 379/208.01
8,331,547 B2 12/2012 Smith et al.
8,515,021 B2 8/2013 Farrand et al.
8,577,000 B1 11/2013 Brown
8,634,520 B1 1/2014 Morrison et al.
8,804,697 B1 8/2014 Capper et al.
8,837,698 B2 9/2014 Altberg et al.
8,988,232 B1 3/2015 Sloo et al.
9,147,054 B1 9/2015 Beal et al.
9,179,279 B2 * 11/2015 Zussman .............. G08B 25/016
9,225,626 B2 12/2015 Capper et al.
9,319,531 B1 4/2016 Capper et al.
9,386,148 B2 7/2016 Farrand et al.
9,386,414 B1 * 7/2016 Mayor .................... H04W 4/02
9,426,288 B2 8/2016 Farrand et al.
9,521,069 B2 12/2016 Gillon et al.
9,560,198 B2 1/2017 Farrand et al.
9,633,547 B2 4/2017 Farrand et al.
9,667,782 B2 5/2017 Farrand et al.
9,787,611 B2 10/2017 Gillon et al.
9,826,372 B2 11/2017 Jeong
9,905,103 B2 * 2/2018 Hsieh ................... G08B 17/125
9,929,981 B2 3/2018 Gillon et al.
10,009,286 B2 6/2018 Gillon et al.
10,116,796 B2 10/2018 Im et al.
10,135,976 B2 11/2018 Farrand et al.
10,158,584 B2 12/2018 Gillon et al.
10,255,792 B2 4/2019 Farrand et al.
10,263,918 B2 4/2019 Gillon et al.
10,297,250 B1 5/2019 Blanksteen et al.
10,341,490 B2 7/2019 Im et al.
2001/0053194 A1 12/2001 Johnson
2002/0016718 A1 2/2002 Rothschild et al.
2002/0035556 A1 3/2002 Shah et al.
2002/0037750 A1 3/2002 Hussain et al.
2002/0038167 A1 3/2002 Chirnomas
2002/0057764 A1 * 5/2002 Salvucci ................. H04M 3/51 379/37
2002/0085692 A1 7/2002 Katz
2002/0130784 A1 * 9/2002 Suzuki ................... G05B 15/02 340/635
2002/0133614 A1 9/2002 Weerahandi et al.
2002/0140549 A1 10/2002 Tseng
2002/0165966 A1 11/2002 Widegren et al.
2003/0027602 A1 2/2003 Han et al.
2003/0058844 A1 3/2003 Sojka et al.
2003/0099334 A1 5/2003 Contractor
2003/0119492 A1 6/2003 Timmins et al.
2003/0133443 A1 7/2003 Klinker et al.
2003/0141093 A1 7/2003 Tirosh et al.
2003/0164877 A1 9/2003 Murai
2003/0184436 A1 10/2003 Seales et al.
2003/0189928 A1 10/2003 Xiong
2004/0001512 A1 1/2004 Challener et al.
2004/0010472 A1 1/2004 Hilby et al.
2004/0010569 A1 1/2004 Thomas et al.
2004/0017803 A1 1/2004 Lim et al.
2004/0059821 A1 3/2004 Tang et al.
2004/0086093 A1 5/2004 Schranz
2004/0090968 A1 5/2004 Kimber et al.
2004/0105444 A1 6/2004 Korotin et al.
2004/0160956 A1 8/2004 Hardy et al.
2004/0235509 A1 11/2004 Burritt et al.
2005/0027887 A1 2/2005 Zimler et al.
2005/0036590 A1 2/2005 Pearson et al.
2005/0053209 A1 * 3/2005 D'Evelyn ............ H04M 3/5116 379/111
2005/0074114 A1 4/2005 Fotta et al.
2005/0078681 A1 4/2005 Sanuki et al.
2005/0089018 A1 4/2005 Schessel
2005/0097222 A1 5/2005 Jiang et al.
2005/0105708 A1 5/2005 Kouchri et al.
2005/0141485 A1 6/2005 Miyajima et al.
2005/0152339 A1 7/2005 Scott et al.
2005/0169247 A1 8/2005 Chen
2005/0180549 A1 8/2005 Chiu et al.
2005/0222820 A1 10/2005 Chung
2005/0238034 A1 10/2005 Gillespie et al.
2005/0238142 A1 * 10/2005 Winegarden ........... H04M 11/04 379/45
2005/0246174 A1 11/2005 DeGolia
2005/0259637 A1 11/2005 Chu et al.
2005/0282518 A1 * 12/2005 D'Evelyn .............. H04M 11/04 455/404.1
2005/0287979 A1 * 12/2005 Rollender ......... H04M 3/42195 455/404.1
2006/0007915 A1 1/2006 Frame
2006/0009240 A1 1/2006 Katz
2006/0013195 A1 1/2006 Son et al.
2006/0059238 A1 3/2006 Slater et al.
2006/0071775 A1 4/2006 Otto et al.
2006/0092011 A1 * 5/2006 Simon ............. G08B 13/19682 340/521
2006/0114894 A1 6/2006 Cherchali et al.
2006/0140352 A1 6/2006 Morris
2006/0156251 A1 7/2006 Suhail et al.

(56) References Cited

U.S. PATENT DOCUMENTS

2006/0167746 A1 7/2006 Zucker
2006/0187898 A1 8/2006 Chou et al.
2006/0206933 A1 9/2006 Molen et al.
2006/0243797 A1 11/2006 Apte et al.
2006/0251048 A1 11/2006 Yoshino et al.
2006/0258341 A1 11/2006 Miller et al.
2006/0259767 A1 11/2006 Mansz et al.
2006/0268848 A1 11/2006 Larsson et al.
2007/0030161 A1* 2/2007 Yang ........................ F24C 7/08 340/679
2007/0032220 A1* 2/2007 Feher .................. H04L 27/2601 455/404.1
2007/0036314 A1 2/2007 Kloberdans et al.
2007/0037560 A1 2/2007 Yun et al.
2007/0037605 A1* 2/2007 Logan ................ G08B 13/1427 455/567
2007/0041517 A1 2/2007 Clarke et al.
2007/0049342 A1 3/2007 Mayer et al.
2007/0054645 A1 3/2007 Pan
2007/0061363 A1 3/2007 Ramer et al.
2007/0061735 A1 3/2007 Hoffberg et al.
2007/0067219 A1 3/2007 Altberg et al.
2007/0071212 A1 3/2007 Quittek et al.
2007/0118750 A1 5/2007 Owen et al.
2007/0121593 A1 5/2007 Vance et al.
2007/0121596 A1 5/2007 Kurapati et al.
2007/0132844 A1 6/2007 Katz
2007/0133757 A1 6/2007 Girouard et al.
2007/0135088 A1* 6/2007 Alessandro ....... H04M 1/72536 455/404.1
2007/0153776 A1 7/2007 Joseph et al.
2007/0165811 A1 7/2007 Reumann et al.
2007/0183407 A1 8/2007 Bennett et al.
2007/0203999 A1 8/2007 Townsley et al.
2007/0223455 A1 9/2007 Chang et al.
2007/0238472 A1 10/2007 Wanless
2007/0255702 A1 11/2007 Orme
2007/0283430 A1 12/2007 Lai et al.
2007/0298772 A1 12/2007 Owens et al.
2008/0016556 A1* 1/2008 Selignan ................. H04W 4/90 726/7
2008/0036585 A1* 2/2008 Gould ..................... G01S 5/166 340/539.2
2008/0049748 A1 2/2008 Bugenhagen et al.
2008/0062997 A1 3/2008 Nix
2008/0075248 A1 3/2008 Kim
2008/0075257 A1 3/2008 Nguyen et al.
2008/0084975 A1 4/2008 Schwartz
2008/0089325 A1 4/2008 Sung
2008/0097819 A1 4/2008 Whitman, Jr.
2008/0111765 A1 5/2008 Kim
2008/0118039 A1 5/2008 Elliot et al.
2008/0125095 A1 5/2008 Mornhineway et al.
2008/0144625 A1 6/2008 Wu et al.
2008/0144884 A1 6/2008 Habibi
2008/0159515 A1 7/2008 Rines
2008/0166992 A1* 7/2008 Ricordi ................ A61B 5/0002 455/404.2
2008/0168145 A1 7/2008 Wilson
2008/0196099 A1 8/2008 Shastri
2008/0200142 A1* 8/2008 Abdel-Kader .... H04M 1/72536 455/404.2
2008/0205386 A1 8/2008 Purnadi et al.
2008/0225749 A1 9/2008 Peng et al.
2008/0247382 A1 10/2008 Verma et al.
2008/0247401 A1 10/2008 Bhal et al.
2008/0270457 A1 10/2008 Zilbershtein et al.
2008/0293374 A1* 11/2008 Berger ................... H04M 11/04 455/404.2
2008/0298348 A1 12/2008 Frame et al.
2008/0309486 A1* 12/2008 McKenna ............... H04W 4/90 340/540
2008/0310599 A1* 12/2008 Purnadi ................ H04M 3/5116 379/37
2008/0313297 A1 12/2008 Heron et al.
2008/0316946 A1 12/2008 Capper et al.
2009/0097474 A1* 4/2009 Ray ....................... H04L 45/306 370/352
2009/0100178 A1 4/2009 Gonzales et al.
2009/0106318 A1 4/2009 Mantripragada et al.
2009/0135008 A1 5/2009 Kirchmeier et al.
2009/0168755 A1 7/2009 Peng et al.
2009/0172131 A1* 7/2009 Sullivan ............... H04M 3/5116 709/219
2009/0186596 A1* 7/2009 Kaltsukis ............... G08B 25/08 455/404.2
2009/0213999 A1 8/2009 Farrand et al.
2009/0224931 A1* 9/2009 Dietz ................ H04M 1/72577 340/670
2009/0240586 A1 9/2009 Ramer et al.
2009/0253428 A1 10/2009 Bhatia et al.
2009/0261958 A1* 10/2009 Sundararajan ...... B60R 21/0132 340/436
2009/0264093 A1 10/2009 Rothschild
2009/0295572 A1 12/2009 Grim, III et al.
2009/0303042 A1 12/2009 Song et al.
2009/0319271 A1 12/2009 Gross
2010/0003960 A1* 1/2010 Ray ....................... G10L 13/043 455/404.2
2010/0034121 A1 2/2010 Bozionek
2010/0046530 A1 2/2010 Hautakorpi et al.
2010/0046731 A1 2/2010 Gisby et al.
2010/0098034 A1 4/2010 Tang et al.
2010/0098235 A1 4/2010 Cadiz et al.
2010/0114896 A1 5/2010 Clark et al.
2010/0136982 A1 6/2010 Zabawskyj et al.
2010/0158223 A1 6/2010 Fang et al.
2010/0191829 A1 7/2010 Cagenius
2010/0195805 A1* 8/2010 Zeigler ................ H04M 3/5116 379/45
2010/0215153 A1* 8/2010 Ray ........................ H04M 11/04 379/45
2010/0220840 A1* 9/2010 Ray .................. H04M 3/42391 379/37
2010/0229452 A1 9/2010 Suk
2010/0246781 A1* 9/2010 Bradburn ............. H04M 3/5116 379/45
2010/0261448 A1* 10/2010 Peters ..................... H04W 4/90 455/404.1
2010/0277307 A1 11/2010 Horton et al.
2010/0278173 A1 11/2010 Dalton et al.
2010/0302025 A1* 12/2010 Script ..................... G01P 15/09 340/539.1
2011/0013591 A1 1/2011 Kakumaru
2011/0047031 A1 2/2011 Weerasinghe
2011/0054689 A1 3/2011 Nielsen et al.
2011/0111728 A1* 5/2011 Ferguson .......... H04M 1/72541 455/404.2
2011/0140868 A1* 6/2011 Hovang ............... G08B 25/008 340/12.55
2011/0170680 A1 7/2011 Chislett et al.
2011/0183652 A1 7/2011 Eng et al.
2011/0208822 A1 8/2011 Rathod
2011/0265145 A1 10/2011 Prasad et al.
2011/0320274 A1 12/2011 Patil
2012/0009904 A1* 1/2012 Modi .................... H04W 4/029 455/413
2012/0010955 A1 1/2012 Ramer et al.
2012/0027191 A1 2/2012 Baril et al.
2012/0035993 A1 2/2012 Nangia
2012/0036576 A1 2/2012 Iyer
2012/0047442 A1* 2/2012 Nicolaou .......... G06F 17/30873 715/738
2012/0092158 A1 4/2012 Kumbhar et al.
2012/0099716 A1 4/2012 Rae et al.
2012/0167086 A1 6/2012 Lee
2012/0178404 A1* 7/2012 Chin ....................... H04W 4/14 455/404.1
2012/0180122 A1 7/2012 Yan et al.
2012/0284778 A1 11/2012 Chiou et al.
2012/0320905 A1 12/2012 Ilagan

(56) References Cited

U.S. PATENT DOCUMENTS

2012/0329420 A1* 12/2012 Zotti ................. H04M 1/72541 455/404.2
2013/0018509 A1 1/2013 Korus
2013/0024197 A1 1/2013 Jang et al.
2013/0035774 A1 2/2013 Warren et al.
2013/0052982 A1* 2/2013 Rohde .................... G06Q 50/01 455/404.1
2013/0053005 A1 2/2013 Ramer et al.
2013/0070928 A1* 3/2013 Ellis ....................... H04R 25/30 381/56
2013/0111589 A1 5/2013 Cho
2013/0136241 A1* 5/2013 Dillon ............... H04M 3/42195 379/45
2013/0154822 A1 6/2013 Kumar et al.
2013/0214925 A1* 8/2013 Weiss ................... G08B 25/001 340/539.11
2013/0229282 A1* 9/2013 Brent ................ H04M 3/42382 340/540
2013/0267791 A1 10/2013 Halperin et al.
2013/0272219 A1 10/2013 Singh et al.
2013/0288639 A1 10/2013 Varsavsky Waisman-Diamond
2013/0293368 A1 11/2013 Ottah et al.
2013/0336174 A1 12/2013 Rubin et al.
2014/0011470 A1* 1/2014 D'Amato ............. G08B 25/009 455/404.1
2014/0022915 A1 1/2014 Caron et al.
2014/0066063 A1 3/2014 Park
2014/0084165 A1* 3/2014 Fadell .................... G08B 17/00 250/340
2014/0085093 A1 3/2014 Mittleman et al.
2014/0101082 A1 4/2014 Matsuoka et al.
2014/0120863 A1 5/2014 Ferguson et al.
2014/0129942 A1 5/2014 Rathod
2014/0156279 A1 6/2014 Okamoto et al.
2014/0169274 A1 6/2014 Kweon et al.
2014/0172953 A1 6/2014 Blanksteen
2014/0181865 A1 6/2014 Koganei
2014/0199946 A1* 7/2014 Flippo ................ H04B 17/0085 455/67.14
2014/0207929 A1 7/2014 Hoshino et al.
2014/0222436 A1 8/2014 Binder et al.
2014/0253326 A1* 9/2014 Cho ....................... G08B 25/10 340/539.13
2014/0266699 A1* 9/2014 Poder ................... G08B 25/001 340/539.13
2014/0273912 A1* 9/2014 Peh ......................... H04W 4/90 455/404.1
2014/0273979 A1 9/2014 Van Os et al.
2014/0306802 A1* 10/2014 Hibbs, Jr. ............ G08B 27/006 340/7.58
2014/0334645 A1 11/2014 Yun et al.
2014/0358666 A1 12/2014 Baghaie et al.
2015/0065078 A1* 3/2015 Mejia ..................... G08B 17/00 455/404.1
2015/0071450 A1 3/2015 Boyden et al.
2015/0082451 A1 3/2015 Ciancio-Bunch
2015/0086001 A1 3/2015 Farrand et al.
2015/0087280 A1 3/2015 Farrand et al.
2015/0089032 A1 3/2015 Agarwal et al.
2015/0100167 A1 4/2015 Sloo et al.
2015/0117624 A1 4/2015 Rosenshine
2015/0138333 A1 5/2015 DeVaul et al.
2015/0145693 A1 5/2015 Toriumi et al.
2015/0200973 A1 7/2015 Nolan
2015/0221207 A1* 8/2015 Hagan .................... G08B 21/22 340/541
2015/0229770 A1 8/2015 Shuman et al.
2015/0242932 A1 8/2015 Beguin et al.
2015/0244873 A1 8/2015 Boyden et al.
2015/0255071 A1 9/2015 Chiba
2015/0262435 A1 9/2015 Delong et al.
2015/0281450 A1 10/2015 Shapiro et al.
2015/0302725 A1 10/2015 Sager et al.
2015/0327039 A1* 11/2015 Jain ......................... H04W 4/90 455/404.2
2015/0334227 A1 11/2015 Whitten et al.
2015/0339912 A1* 11/2015 Farrand ................ G08B 25/001 340/501
2015/0358795 A1* 12/2015 You ......................... H04W 4/90 455/404.2
2015/0379562 A1 12/2015 Spievak et al.
2016/0036751 A1 2/2016 Ban
2016/0036962 A1 2/2016 Rand
2016/0066011 A1 3/2016 Ro et al.
2016/0078750 A1 3/2016 King et al.
2016/0117684 A1 4/2016 Khor et al.
2016/0142758 A1 5/2016 Karp et al.
2016/0173693 A1 6/2016 Spievak et al.
2016/0219150 A1 7/2016 Brown
2016/0248847 A1* 8/2016 Saxena ................... H04L 67/18
2016/0269882 A1* 9/2016 Balthasar ................ H04W 4/90
2016/0277573 A1 9/2016 Farrand et al.
2016/0300260 A1 10/2016 Cigich et al.
2016/0315909 A1 10/2016 von Gravrock et al.
2016/0323446 A1 11/2016 Farrand et al.
2016/0330108 A1 11/2016 Gillon et al.
2016/0330319 A1 11/2016 Farrand et al.
2016/0330770 A1* 11/2016 Lee ....................... H04W 4/025
2016/0373372 A1 12/2016 Gillon et al.
2017/0021802 A1* 1/2017 Mims .................... B60R 25/102
2017/0024995 A1 1/2017 Gu et al.
2017/0034044 A1 2/2017 Gillon et al.
2017/0034045 A1 2/2017 Gillon et al.
2017/0034062 A1 2/2017 Gillon et al.
2017/0034081 A1 2/2017 Gillon et al.
2017/0084164 A1 3/2017 Farrand et al.
2017/0104875 A1 4/2017 Im et al.
2017/0188216 A1* 6/2017 Koskas ................... H04W 4/90
2017/0270569 A1 9/2017 Altberg et al.
2017/0293301 A1 10/2017 Myslinski
2017/0339228 A1 11/2017 Azgin et al.
2018/0061213 A1 3/2018 Morehead
2018/0075540 A1 3/2018 Bernard et al.
2018/0152557 A1 5/2018 White et al.
2018/0262441 A1 9/2018 Gillon et al.
2018/0302334 A1 10/2018 Osterlund et al.
2018/0324105 A1 11/2018 Gillon et al.
2018/0365969 A1 12/2018 Krein et al.
2018/0375927 A1 12/2018 Nozawa
2019/0045058 A1 2/2019 Im et al.
2019/0052752 A1 2/2019 Farrand et al.
2019/0206227 A1 7/2019 Farrand et al.
2019/0222993 A1* 7/2019 Maheshwari ........ G08B 29/185

FOREIGN PATENT DOCUMENTS

WO WO2015041738 3/2015
WO WO2015179120 A1 11/2015
WO WO2016007244 A1 1/2016
WO WO2016182796 A1 11/2016
WO WO2018044657 3/2018

OTHER PUBLICATIONS

International Search Report and Written Opinion dated Nov. 7, 2014 for App. No. PCT/US2014/044945, filed Jun. 30, 2014.
Non-Final Office Action, dated Aug. 26, 2008, U.S. Appl. No. 10/888,603, filed Jul. 9, 2004.
Non-Final Office Action, dated May 11, 2009, U.S. Appl. No. 11/717,947, filed Mar. 13, 2007.
Non-Final Office Action, dated Nov. 24, 2009, U.S. Appl. No. 11/717,947, filed Mar. 13, 2007.
Final Office Action, dated Jun. 23, 2010, U.S. Appl. No. 11/717,947, filed Mar. 13, 2007.
Non-Final Office Action, dated Sep. 13, 2010, U.S. Appl. No. 11/717,947, filed Mar. 13, 2007.
Non-Final Office Action, dated Feb. 16, 2011, U.S. Appl. No. 11/717,947, filed Mar. 13, 2007.
Final Office Action, dated May 25, 2011, U.S. Appl. No. 11/717,947, filed Mar. 13, 2007.

(56) References Cited

OTHER PUBLICATIONS

Non-Final Office Action, dated Dec. 6, 2011, U.S. Appl. No. 12/214,756, filed Jun. 20, 2008.
Final Office Action, dated May 31, 2012, U.S. Appl. No. 12/214,756, filed Jun. 20, 2008.
Non-Final Office Action, dated Feb. 12, 2014, U.S. Appl. No. 12/214,756, filed Jun. 20, 2008.
Final Office Action, dated Jul. 31, 2014, U.S. Appl. No. 12/214,756, filed Jun. 20, 2008.
Non-Final Office Action, dated Dec. 27, 2011, U.S. Appl. No. 12/156,562, filed Jun. 2, 2008.
Final Office Action, dated Apr. 3, 2012, U.S. Appl. No. 12/156,562, filed Jun. 2, 2008.
Non-Final Office Action, dated Jul. 13, 2012, U.S. Appl. No. 12/156,562, filed Jun. 2, 2008.
Final Office Action, dated Jul. 31, 2013, U.S. Appl. No. 12/156,562, filed Jun. 2, 2008.
Non-Final Office Action, dated Jul. 7, 2011, U.S. Appl. No. 12/006,587, filed Jan. 2, 2008.
Final Office Action, dated Jan. 18, 2012, U.S. Appl. No. 12/006,587, filed Jan. 2, 2008.
Advisory Action, dated Feb. 14, 2012, U.S. Appl. No. 12/006,587, filed Jan. 2, 2008.
Non-Final Office Action, dated Sep. 10, 2013, U.S. Appl. No. 12/006,587, filed Jan. 2, 2008.
Final Office Action, dated Jan. 31, 2014, U.S. Appl. No. 12/006,587, filed Jan. 2, 2008.
Advisory Action, dated Mar. 24, 2014, U.S. Appl. No. 12/006,587, filed Jan. 2, 2008.
Non-Final Office Action, dated Sep. 16, 2014, U.S. Appl. No. 12/006,587, filed Jan. 2, 2008.
Non-Final Office Action, dated Sep. 29, 2011, U.S. Appl. No. 12/072,381, filed Feb. 25, 2008.
Final Office Action, dated Feb. 10, 2012, U.S. Appl. No. 12/072,381, filed Feb. 25, 2008.
Advisory Action, dated Apr. 16, 2012, U.S. Appl. No. 12/072,381, filed Feb. 25, 2008.
Non-Final Office Action, dated Dec. 30, 2013, U.S. Appl. No. 14/034,457, filed Sep. 23, 2013.
Final Office Action, dated Jul. 1, 2014, U.S. Appl. No. 14/034,457, filed Sep. 23, 2013.
Advisory Action, dated Sep. 18, 2014, U.S. Appl. No. 14/034,457, filed Sep. 23, 2013.
Advisory Action, dated Oct. 9, 2014, U.S. Appl. No. 12/214,756, filed Jun. 20, 2008.
Advisory Action, dated Nov. 5, 2014, U.S. Appl. No. 12/214,756, filed Jun. 20, 2008.
Non-Final Office Action, dated Mar. 26, 2015, U.S. Appl. No. 12/156,562, filed Jun. 2, 2008.
Final Office Action, dated Jan. 23, 2015, U.S. Appl. No. 12/006,587, filed Jan. 2, 2008.
Advisory Action, dated Apr. 8, 2015, U.S. Appl. No. 12/006,587, filed Jan. 2, 2008.
Non-Final Office Action, dated Jan. 29, 2015, U.S. Appl. No. 14/034,457, filed Sep. 23, 2013.
Non-Final Office Action, dated Jan. 7, 2015, U.S. Appl. No. 14/318,630, filed Jun. 28, 2014.
International Search Report and Written Opinion dated Jul. 27, 2015 for App. No. PCT/US2015/029109, filed May 4, 2015.
Notice of Allowance, dated Sep. 10, 2015, U.S. Appl. No. 12/214,756, filed Jun. 20, 2008.
Final Office Action, dated Jul. 15, 2015, U.S. Appl. No. 12/156,562, filed Jun. 2, 2008.
Final Office Action, dated Apr. 5, 2013, U.S. Appl. No. 12/072,381, filed Feb. 25, 2008.
Advisory Action, dated May 16, 2013, U.S. Appl. No. 12/072,381, filed Feb. 25, 2008.
Notice of Allowance, dated Jun. 13, 2013, U.S. Appl. No. 12/072,381, filed Feb. 25, 2008.
Non-Final Office Action, dated Aug. 24, 2015, U.S. Appl. No. 14/034,457, filed Sep. 23, 2013.
Non-Final Office Action, dated Jul. 21, 2015, U.S. Appl. No. 14/318,630, filed Jun. 28, 2014.
Non-Final Office Action, dated Nov. 12, 2015, U.S. Appl. No. 14/283,132, filed May 20, 2014.
Non-Final Office Action, dated Nov. 13, 2015, U.S. Appl. No. 14/318,630, filed Jun. 28, 2014.
International Search Report and Written Opinion dated Nov. 2, 2015 for App. No. PCT/US2015/034054, filed Jun. 3, 2015.
Non-Final Office Action, dated Nov. 5, 2012, U.S. Appl. No. 12/072,381, filed Jun. 20, 2008.
Non-Final Office Action, dated Sep. 9, 2016, U.S. Appl. No. 15/212,185, filed Jul. 15, 2016.
Notice of Allowance, dated Sep. 26, 2016, U.S. Appl. No. 15/212,185, filed Jul. 15, 2016.
Non-Final Office Action, dated Nov. 16, 2016, U.S. Appl. No. 12/156,562, filed Jun. 2, 2008.
Non-Final Office Action, dated May 17, 2016, U.S. Appl. No. 12/156,562, filed Jun. 2, 2008.
Notice of Allowance, dated May 31, 2016, U.S. Appl. No. 14/318,630, filed Jun. 28, 2014.
Non-Final Office Action, dated Jun. 9, 2016, U.S. Appl. No. 14/283,132, filed May 20, 2014.
Non-Final Office Action, dated Jul. 14, 2016, U.S. Appl. No. 15/169,615, filed May 31, 2016.
Notice of Allowance, dated Aug. 1, 2016, U.S. Appl. No. 14/708,132, filed May 8, 2015.
International Search Report and Written Opinion dated Jun. 30, 2016 for App. No. PCT/US2016/030597, filed May 3, 2016.
Notice of Allowance, dated Dec. 15, 2016, U.S. Appl. No. 14/283,132, filed May 20, 2014.
Notice of Allowance, dated Jan. 18, 2017, U.S. Appl. No. 15/169,615, filed May 31, 2016.
Non-Final Office Action, dated Nov. 5, 2012, U.S. Appl. No. 12/214,756, filed Jun. 20, 2008.
Notice of Allowance, dated Mar. 6, 2017, U.S. Appl. No. 15/292,043, filed Oct. 12, 2016.
Non-Final Office Action, dated Mar. 23, 2017, U.S. Appl. No. 15/208,004, filed Jul. 12, 2016.
Non-Final Office Action, dated Mar. 29, 2017, U.S. Appl. No. 14/879,329, filed Oct. 9, 2015.
Non-Final Office Action, dated Apr. 18, 2017, U.S. Appl. No. 15/292,051, filed Oct. 12, 2016.
Non-Final Office Action, dated Apr. 18, 2017, U.S. Appl. No. 15/369,655, filed Dec. 5, 2016.
European Patent Application No. 14845956.3, "Extended European Search Report," dated Feb. 16, 2017, 8 pages.
Canadian Patent Application No. 2949211, "Office Action," dated Aug. 16, 2017, 4 pages.
"Office Action," Canadian Patent Application No. 2954351, dated Oct. 27, 2017, 3 pages.
"International Search Report" and "Written Opinion of the International Searching Authority," Patent Cooperation Treaty Application No. PCT/US2017/048284, dated Nov. 8, 2017, 8 pages.
"Office Action," European Patent Application No. 14845956.3, dated Apr. 9, 2018, 4 pages.
"Extended European Search Report," European Patent Application No. 15796148.3, dated Jan. 8, 2018, 8 pages.
"Extended European Search Report," European Patent Application No. 15818258.4, dated Feb. 26, 2018, 8 pages.
Vaidya, Govind, "Automatic Object Detection and Recognition via a Camera System", U.S. Appl. No. 16/163,521, filed Oct. 17, 2018, 40 pages.
"Partial Supplementary European Search Report," European Patent Application No. 16793194.8, dated Nov. 19, 2018, 10 pages.
"Notice of Allowance," European Patent Application No. 14845956.3, dated Jul. 11, 2018, 7 pages.
Osterlund, Karl et al., "Communications Network Failure Detection and Remediation," U.S. Appl. No. 16/011,479, dated Jun. 18, 2018, Specification, Claims, Abstract, and Drawings, 92 pages.
"Notice of Allowance", Canadian Patent Application No. 2949211, dated Jul. 31, 2018, 1 page.

(56) References Cited

OTHER PUBLICATIONS

"Office Action," Canadian Patent Application No. 2954351, dated Aug. 22, 2018, 4 pages.
"Extended European Search Report," European Patent Application No. 16793194.8, dated Feb. 26, 2019, 9 pages.
"Notice of Allowance", Canadian Patent Application No. 2954351, dated Aug. 27, 2019, 1 page.

* cited by examiner

APPLIANCE DEVICE INTEGRATION WITH ALARM SYSTEMS

CROSS-REFERENCE TO RELATED APPLICATIONS

This Application is related to U.S. patent application Ser. No. 14/283,132, filed May 20, 2014, now granted as U.S. Pat. No. 9,633,547 issued on Apr. 25, 2017, the disclosure of which is hereby incorporated by reference in its entirety.

BACKGROUND OF THE INVENTION

Field of the Invention

The present technology pertains to monitoring and control of appliances, and more specifically to monitoring and control of appliances using sensor data.

Description of Related Art

Consumer electronics, such as thermostats, smoke alarms, television remote controls, intercoms, and internet of things (IOT) devices are becoming prevalent in homes, but do not communicate with residential alarm systems. Commercial and residential alarm systems detect intrusions and hazardous conditions (e.g., fire) to prevent injury and property loss. Alarm systems generally include switches on doors and windows, motions detectors, and heat sensors, but their use and associated data are limited to the alarm system. Alarm systems optionally include panic buttons, which allow a user to initiate an alarm upon the touch of a button. However, the expense of installing panic buttons and their fixed locations have limited their adoption.

BRIEF SUMMARY OF THE INVENTION

In at least one embodiment, the present technology is directed to a method for intelligent control of an appliance device. The method may include receiving information from at least one sensor using a computer network, the at least one sensor associated with an alarm system, the alarm system associated with a structure; and operating the appliance device using the received information.

In at least one embodiment, the present technology is directed to a method for notifying first responders of an emergency situation at a structure. The method may include receiving from an appliance device a user input using a computer network; and contacting a user associated with the appliance device, the contacting including at least one of a short message service (SMS) text message, push notification, email, audio message, video message, push notification or similar network signaling method, and telephone call, the telephone call using at least one of plain old telephone service (POTS), T1, and Voice-over-Internet Protocol (VoIP).

In at least one embodiment, the present technology is directed to a method for provisioning an appliance device. The method may include receiving a service address from a user associated with an appliance device; validating the received service address; storing the validated service address; receiving a panic signal from the user using the appliance device after the validated service address is stored; providing the validated service address to an emergency telephone number service provider for provisioning; and transmitting the validated service address to a public safety access point (PSAP) associated with the validated service address, the transmitting in response to the provisioning being successful.

In at least one embodiment, the present technology is directed to a method for provisioning an appliance device. The method may include receiving a service address from a user associated with an appliance device; validating the received service address; storing the validated service address; receiving a panic signal from the user using the appliance device after the validated service address is stored; providing the validated service address to an emergency telephone number service provider for provisioning; and transmitting the validated service address to a national PSAP, the transmitting in response to the provisioning being unsuccessful.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments. The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
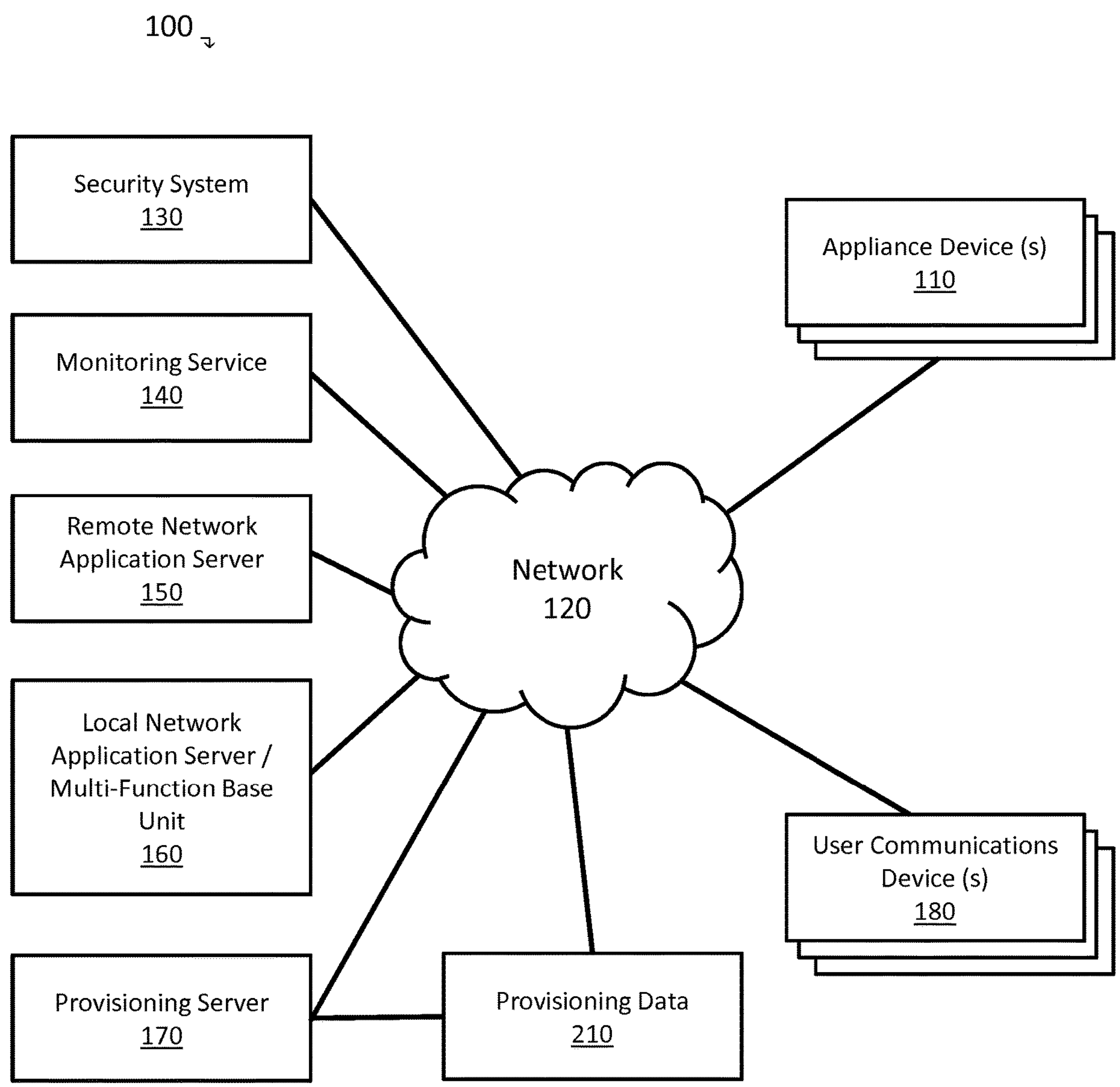
FIG. 1 is a simplified block diagram of a system, according to some embodiments of the present invention.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

According to various embodiments of the present invention, (home or consumer) appliance devices—such as thermostats, TV remote controls, light switches, electrical outlets, home theater systems, smoke detectors, carbon monoxide detectors, pool safety alarms, intercom devices, and the like—connect to local area networks (LANs) in a commercial or residential structure (e.g., home) through wireless and/or wired connections. The LAN connection, for example, enables appliance devices to be monitored and/or controlled from a central location, improving their function, providing additional capabilities, allowing them to coordinate actions with other appliances, and the like. Additionally, the LAN connection enables appliance devices to share information obtained by each device (e.g., through sensors or user input) with other devices. Such interconnection of appliance devices can make them easier to use for the end user. Integration of appliance devices with an alarm system, for example, offers opportunities to improve the performance and/or capabilities of the alarm system by incorporating appliance devices, and to improve the performance of appliance devices by access to capabilities of the alarm system.

In various embodiments, home security systems include a plurality of sensors that provide valuable information about the state of a structure (e.g., house). Sensors, for example, monitor if any doors or windows are opened or have been left open. Motion sensors, pressure sensors, vibration sensors, and/or sound sensors can detect the presence of individuals; magnetic sensors can detect the presence of vehicles at a residence; and smoke, water, and/or carbon monoxide detectors can monitor the environment for hazardous conditions. While the sensors conventionally provide information to the security system to determine if an intruder is present or another threat has arisen, the sensors in the present technology also provide valuable and useful information to home appliance devices, which can improve the appliance device's utility, usability, and/or performance.

Panic buttons may be a feature of home security systems. Panic buttons enable a user to initiate an alarm at the touch of a button, for example, requesting police, fire, or ambulance service, or indicating that an end user requires assistance in some other way. However, the expense of the panic button and its installation are impediments to its wide adoption, and the placement of the panic button in the home can be unsightly, inconvenient, or in a location that is not accessible when needed. Some embodiments provide an affordable method to embed the desirable function of the panic button into other appliance devices in the home (in addition to the devices' associated control applications), and increases the usefulness of both the appliance device and the security system. In addition, the utility of the panic button can be increased by using network connectivity and/or additional capabilities of the appliance device.

FIG. 1 illustrates system 100 (e.g., in a commercial or residential structure) for communication, data exchange, and use of the information that has been exchanged among at least appliance devices and security systems. The system of FIG. 1 includes an electronic device (appliance device) 110, by way of example and not limitation, a thermostat, remote control, intercom, light switch, door bell, telephone handset, video game system, garage door control system, environmental sensor incorporates some mechanism allowing a user to interact with that device to indicate a panic situation, and the like. The interaction mechanism may be associated with one or more appliance devices and may be in different forms. The interaction mechanism, for example, may be at least one of a dedicated button, "soft" or programmable button on a display, accelerometer (e.g., detecting shaking and/or striking), touch sensor, audio sensor (e.g., recognizing speech or a loud scream), switch conventionally provisioned for a different purpose (e.g., light switch), and the like that when operated in a particular way (e.g. clicking 3 times rapidly than holding down) initiates the interaction or some other response/action.

Appliance device 110 in the structure communicates wirelessly and/or through a wired connection with interconnect and/or network 120. Interconnect and/or network 120 may be one or more of a public computer network (e.g., the Internet), local computer network (e.g., LAN), a wireless computer network (e.g., WiFi), a wired computer network, and the like; other network technology (e.g. Bluetooth, ZigBee, ZWave, DECT, and the like); plain old telephone service, T1, and/or Voice over IP (VoIP) phone network; a cellular network; a proprietary network connection; and the like. Interconnect and/or network 120 may include multiple devices, translators, aggregators or concentrators that allow information on one type of network to reach devices on a different type of network. Appliance device 110 (e.g., thermostats and smoke detectors) may include wireless and/or wired network capability in addition to buttons and/or control panels. Various states of appliance device 110 may be communicated over the network to other networked devices or networked application servers. In addition, the network capability of appliance device 110 may be used to send panic signals.

In various embodiments, one or more appliance devices 110 are equipped to generate a panic signal and transmit it over network/interconnect 120. After appropriate translation between different network protocols as needed, the panic signal is received by one or more of security system 130, network-connected monitoring service 140, network application server 150, and local network application server/multi-function base unit 160.

When an emergency condition (e.g., presence of an intruder, fire, medical emergency, and the like) is perceived, the end user may activate the panic feature/mechanism associated with appliance device 110 (e.g., by pressing a button, striking appliance device 110 sufficiently to cause the embedded accelerometer to trigger, etc.). When the panic feature is activated, a panic signal is provided over the device's network connection using interconnect and/or network 120, and the panic signal notifies one or more of security system 130, network-connected monitoring service 140, network application server 150, and local network application server/multi-function base unit 160.

User communication device(s) 180 include at least one of a personal computer (PC), hand held computing system, telephone, mobile computing system, workstation, tablet, phablet, wearable, mobile phone, server, minicomputer, mainframe computer, or any other computing system. User communication device(s) 180 is described further in relation to computing system 800 in FIG. 8.

In some embodiments user communication device(s) 180 may include a web browser (or other software application) to communicate, for example, with a 911 service provider. For example, computing device 110 is a PC running a web browser inside (or outside) a commercial or residential structure. Additionally or alternatively, computing device 110 is a smart phone running a client (or other software application).

In various embodiments user communication device(s) 180 is used for telecommunications. For example, a user from his web or smartphone client upon could initiate a panic signal (and any emergency call signals that may result) as if it were originating from the structure, rather than from the user's smartphone client. Normally a 911 call from a cell phone is directed to a PSAP associated with the geographical location of the cell phone. According to some embodiments, a PSAP is a call center responsible for answering calls to an emergency telephone number for emergency services, such as police, fire, and ambulance services. For example, telephone operators may dispatch such emergency services. The present technology is capable of caller location for landline calls and mobile phone locations. For a user at a remote location who is notified of an emergency situation at the structure, dialing 911 from his cell phone could normally result in significant delay as he explains the situation to the PSAP serving the physical location of his smartphone (rather than that of the house that has been invaded), then waits for his call to be transferred to a PSAP in the area of his home and then takes the time to communicate the location of the house that is being invaded (which may even be in another state), and convinces the authorities to go to the structure.

In some embodiments, user communication device(s) 180 receives push notifications using a client (or other software application) running on user communication device(s) 180. For example, the push access protocol (PAP) (e.g., WAP-164 of the Wireless Application Protocol (WAP) suite from the Open Mobile Alliance) may be used.

System 100 of FIG. 1 further includes provisioning data 210. In some embodiments, at least one of security system 130, monitoring service 140, remote network application server 150, and local application server/multi-function base unit 160 may access provisioning data 210, for example by accessing (e.g., reading or writing to) it directly, by communicating with provisioning server 170, and the like. Provisioning data 210 stores information related to the end user/owner of appliance device 110.

Data stored by provisioning data 210 provided by security system 130, monitoring service 140, remote network application server 150, local application server/multi-function base unit 160, and/or provisioning server 170 may include at least one of usage information, user preferences information, and a service address of the structure (e.g., in which the appliance device is disposed). An operator of a processing entity (e.g., alarm service which remotely monitors the alarm system) may validate the service address and/or ensure the accuracy of the address information provided by the end user/owner of the appliance device. Incorrect or inaccurate information may result in sending first responders to the wrong location in the event of an emergency.

Figure 2:
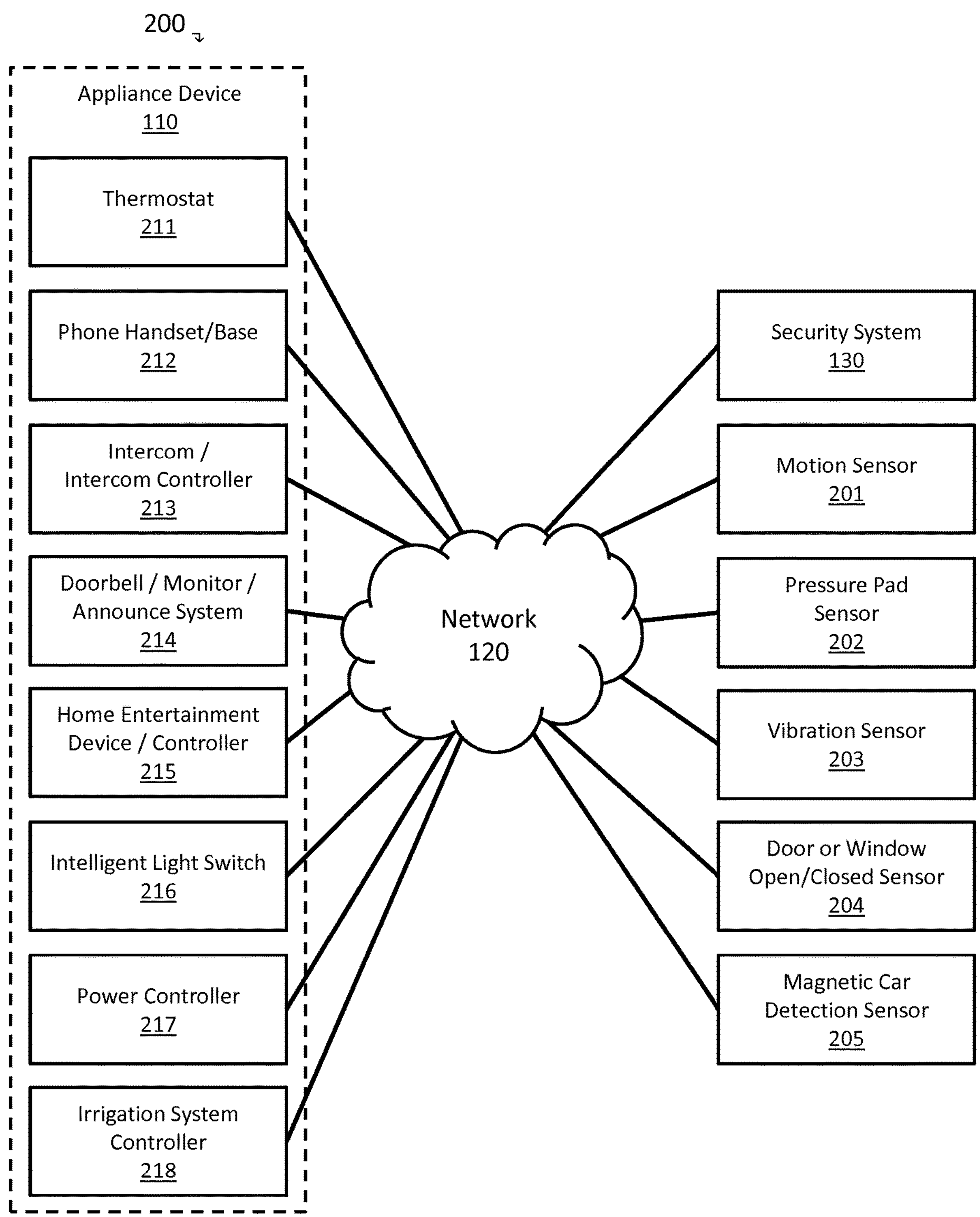
FIG. 2 is a simplified block diagram of an environment of a structure, in accordance with various embodiments.

FIG. 2 illustrates system 200 includes at least one sensor associated with security system 130, by way of example and not limitation, motion sensor 201, pressure sensitive pad 202, vibration sensor 203, door or window close/open switch 204, and magnetic sensor (e.g., may determine if a car is in the driveway or parking space) 205. Sensors 201-205 may communicate with home security system 130 using interconnect and/or network 120. Interconnect and/or network 120 may be wired and/or wireless, use at least one communications protocol, and use adaptors to interface different devices, media, and protocols. One or more of appliance devices 110 are communicatively coupled to interconnect and/or network 120. Appliance devices 110 may include (but are not limited to) thermostat 211, phone handset/base 212, intercom/intercom controller 213, door bell/monitor/announce system 214, home entertainment device/device controller 215, intelligent light switch 216, power controller 217, and an irrigation control system 218.

For example, security system 130 and sensors 201-205 communicate with one or more appliance devices 211-218 (110 in FIG. 1) using interconnect and/or network 120. In addition or alternatively, appliance devices 211-218 may query security system 130 and/or sensors 201-205. Information provided by security system 130 and/or sensors 201-205 may be used by appliance devices 211-218 to improve their performance, utility, and usability.

For example, thermostat 211 uses information provided by door or window close/open switch(s) 204 to determine when a window in the structure has been left open. To save energy, thermostat 211 may disable a climate control system associated with the structure while the windows are open.

For example, thermostat 211 uses the information provided by at least one of motion, pressure, and vibration sensors 201-203, and alarm system 130 (e.g., state information such as home, away, and the like) to determine occupancy and a state of the occupants (e.g., awake, sleeping, and the like). Using such information, thermostat 211 may adjust temperatures, enable or disable the climate control system, and the like. In some embodiments, thermostat 211 includes a (built-in) motion sensor (or similar sensor), and the state of the security system may be used in conjunction with information provided by the (built-in) motion sensor.

For example, at least one of phone handset/base 212, intercom/intercom controllers 213, door bell/monitor/announce system 214, and home entertainment device/controller 215 uses information provided by motion, pressure, or vibration sensors 201-203, and the state of the alarm system 130 (e.g., home, away, and the like) to determine occupancy and the state of the occupants (e.g., awake, sleeping, and the like). Using such information, at least one of phone handset/base 212, intercom/intercom controllers 213, door bell/monitor/announce system 214, and home entertainment device/controller 215 may be powered down when unused, be muted or silenced to ensure they do not disturb (sleeping) occupants, and the like. Additionally, more sophisticated actions are possible, for example, screening calls or doorbell presses selectively, allowing only very important (e.g., urgent) calls or doorbell presses.

For example, intelligent light switches 216 and power control modules 217 use information provided by at least one of motion, pressure, or vibration sensors 201-203, and the state of the alarm system 130 (e.g., at home, away, and the like) to determine occupancy and the state of the occupants (e.g., awake, sleeping, and the like). Using such information, intelligent light switches 216 and power control modules 217 may turn off power to unused devices, turn lights off, etc. In various embodiments, intelligent light switches 216 and power control modules 217 include a (built-in) motion sensor (or similar device), and the state of the security system may be used in conjunction with information provided by the (built-in) motion sensor.

For example, irrigation control system 218 uses information provided by magnetic sensor 205 to determine when a car has been left out overnight, and based on the determination suppress activation of an irrigation zone that would cause the car to become wet.

For example, irrigation control system 218 uses information provided by door or window close/open switch 204 to determine that a window near a sprinkler zone or garage door is open, and prevent that irrigation zone from running and spraying water into the structure.

As would be readily appreciated by one of ordinary skill in the art, different combinations and permutations of appliance devices 211-218 may use information provided by different combinations and permutations of sensors 201-205 to control operation of respective appliance devices 211-218. Moreover as would be readily appreciated by one of ordinary skill in the art, different appliance devices 110 (FIG. 1) and sensors associated with security system 130 (FIG. 1) may be used.

Figure 3:
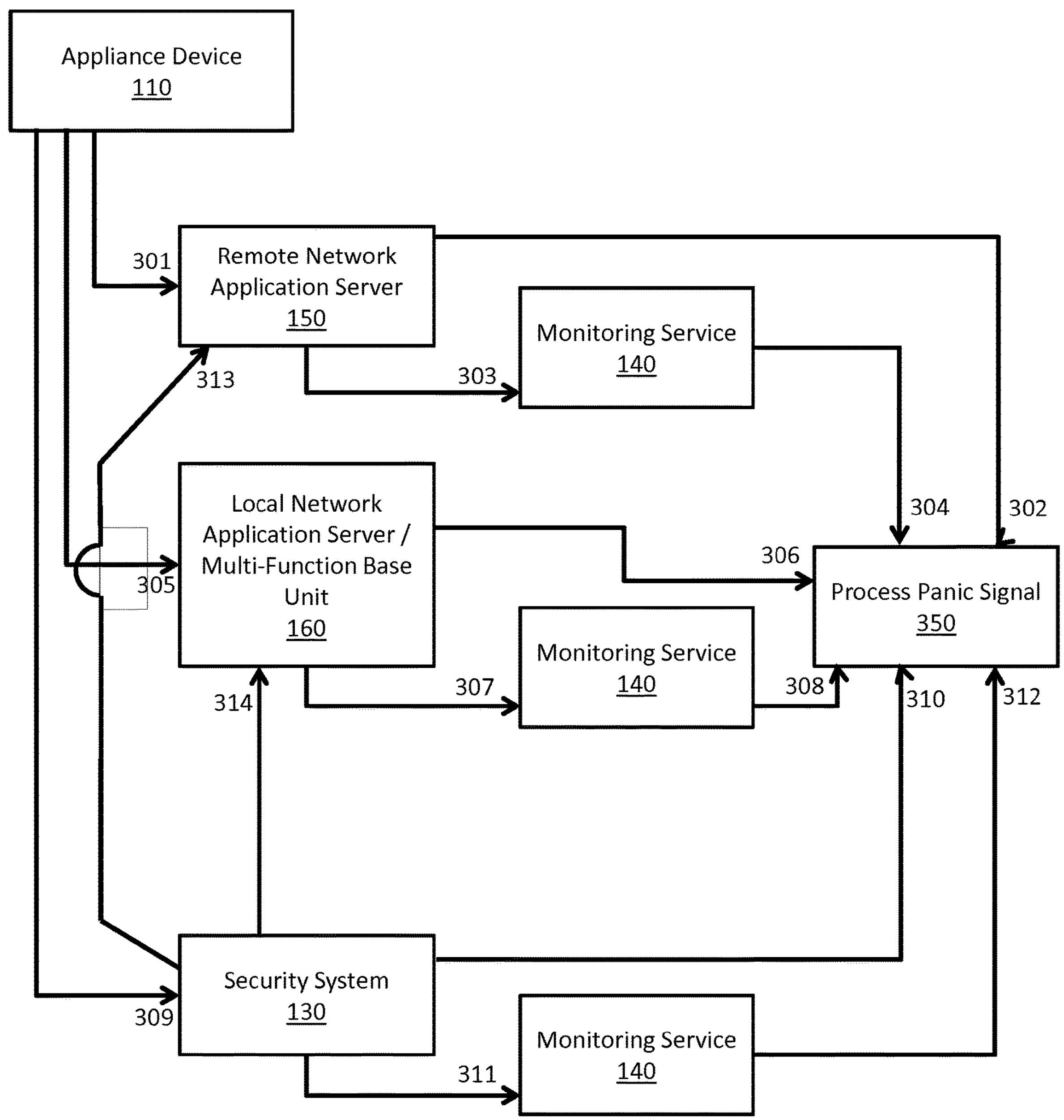
FIG. 3 is a simplified block diagram of a security system, according to several embodiments.

FIG. 3 illustrates processing paths for a panic button signal generated by appliance device 110 including security system 130, monitoring service 140, remote network application server 150, and local application server/multi-function base unit 160, according to some embodiments.

For example, remote network application server 150 receives the panic signal (or alert) 301 generated by appliance device 110. Remote network application server 150 may access provisioning information 210 (e.g., directly and/or using provisioning server 170, shown in FIG. 1). When the panic signal is received, remote application server 150 (serving as a processing entity) processes the panic signal at 350 as shown by path 302.

For example, remote network application server 150 receives the panic signal 301 and (instead of processing it directly) panic signal 303 is provided to monitoring service 140. Monitoring service 140 may access provisioning information 210 (e.g., directly and/or using provisioning server 170, shown in FIG. 1). When the panic signal 303 is received, the remote monitoring service (serving as the processing entity) processes the panic signal at 350 as shown by path 302.

For example, local network application server/multi-function base unit 160 receives panic signal 305 generated by appliance device 110. Local network application server/multi-function base unit 160 may access provisioning information 210 (e.g., directly and/or using provisioning server 170, shown in FIG. 1). When the panic signal 305 is received, local network application server/multi-function base unit 160 (serving as the processing entity) processes the panic signal at 350, as shown by path 306, and as described below. In various embodiments, local network application server/multi-function base unit 160 may provide other services in addition to monitoring for panic signals, for example, home automation services, home entertainment services, telephony services, and the like.

For example, local network application server/multi-function base unit 160 receives panic signal 305, and (instead of processing it directly) panic signal 307 is provided to monitoring service 140. Monitoring service 140 may access provisioning information 210 (e.g., directly and/or using provisioning server 170, shown in FIG. 1). When the panic signal 305 is received, remote monitoring service 140 (serving as the processing entity) processes the panic signal at 350, as shown by path 308.

For example, security system 130 receives panic signal 309 provided by appliance device 110. Security system 130 may access provisioning information 210 (e.g., directly and/or using provisioning server 170, shown in FIG. 1). When panic signal 309 is received, security system 103 (serving as the processing entity) processes the panic signal at 350, as shown by path 310.

For example, security system 130 receives panic signal 309, and (instead of processing it directly) panic signal 311 is provided to monitoring service 140. Monitoring service 140 may access provisioning information 210 (e.g., directly and/or using provisioning server 170, shown in FIG. 1). When panic signal 311 is received, remote monitoring service 140 (serving as the processing entity) processes the panic signal at 350, as shown by path 312.

For example, security system 130 receives panic signal 309, and (instead of processing it directly) panic signal 313 is provided to remote network application server 150. Remote network application server 150 may (serving as the processing entity) processes the panic signal at 350 directly as shown by path 302 and/or may provide panic signal 303 to monitoring service 140 for processing (e.g., monitoring service serves as the processing entity) at 350, as shown by path 304. Remote application server 150 and/or monitoring service 140 may access provisioning information 210 (e.g., directly and/or using provisioning server 170, shown in FIG. 1).

For example, security system 130 receives the panic signal 309, and (instead of processing it directly) panic signal 314 is provided to local network application server/multi-function base unit 160. Local network application server/multi-function base unit 160 (serving as the processing entity) may processes the panic signal at 350 directly, as shown by path 306, and/or provide panic signal 307 to monitoring service 140 for processing (e.g., monitoring service serves as the processing entity) at 350, as shown by path 308. Remote application server 150 or monitoring service 140 may access provisioning information 210 (e.g., directly and/or using provisioning server 170, shown in FIG. 1).

For example, security system 130 receives panic signal 309 from appliance device 110, and panic signal 313 is provided to remote network application server 150 and/or panic signal 314 is provided to local network application server/multi-function base unit 160. Remote application server 150 and/or local application server 160 may include provisioning information and/or receive information, relating to the end user/owner of appliance device 110 issuing the panic signal, from provisioning server 170 (not shown in FIG. 3). When panic signal 313 and/or 314 is received, remote application server 150 and/or local application server 160 (respectively, serving as the processing entity) go on to processes the panic signal at 350.

Figure 4:
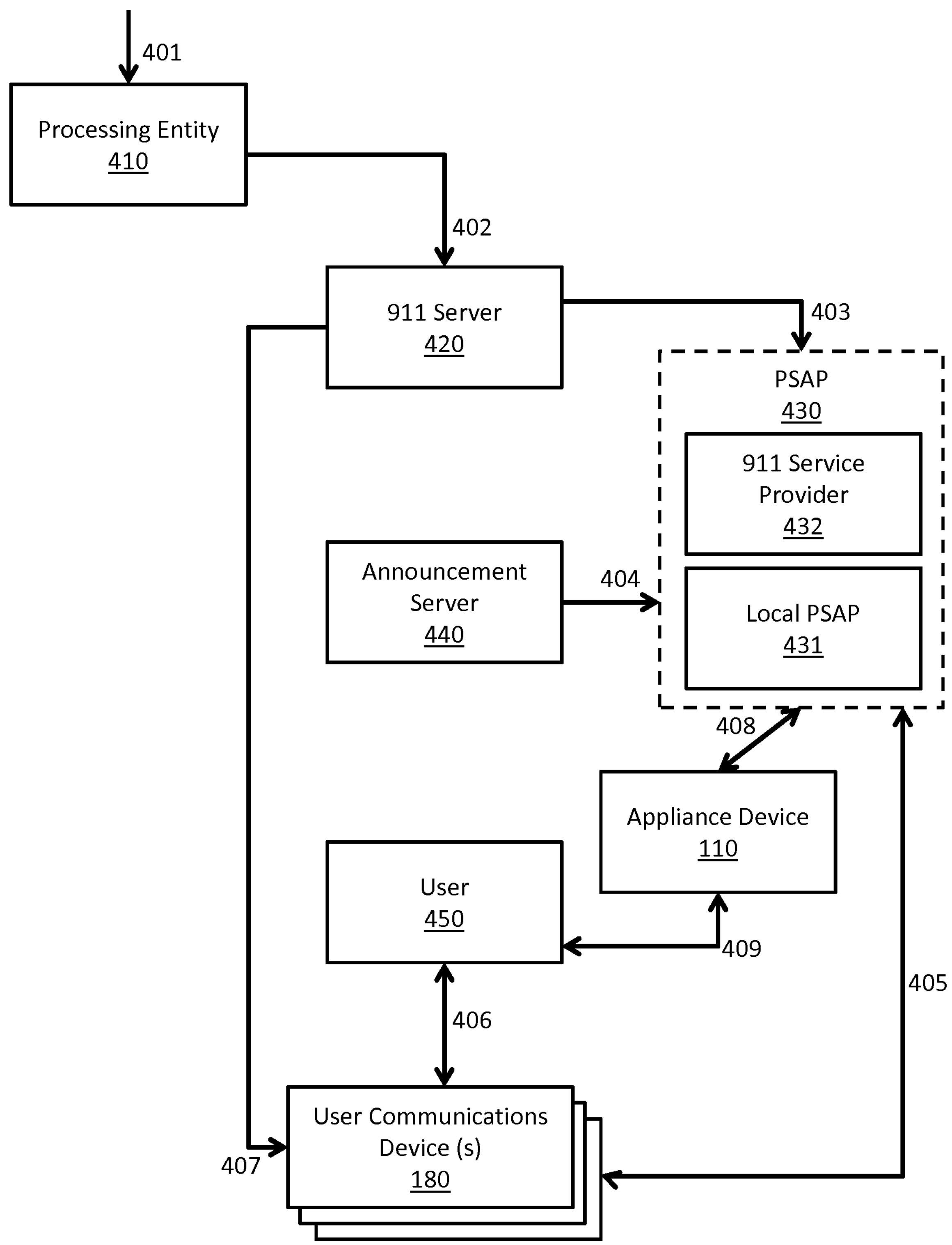
FIG. 4 is a simplified block diagram of processing paths for a panic button signal, in accordance with some embodiments.

FIG. 4 illustrates processing paths for a panic button signal 401 received by processing entity 410. Processing entity 410 may be one or more of security system 130, monitoring service 140, remote network application server 150, and local network application server/multi-function base unit 160 (shown in FIG. 3), or be another entity receiving signal 401 from one of security system 130, monitoring service 140, remote network application server 150, and local network application server/multi-function base unit 160. In response to receiving panic signal 401 using network 120 (and optionally at least one of security system 130, remote network application server 150, and local application server/multi-function base unit 160, shown in FIG. 1), processing entity 410 may instruct 402 a 911 (or other emergency telephone number) server 420 to initiate a call. Call 403 is placed to the Public Safety Answering Point (PSAP) 430 associated with the physical address where appliance device 110 is located. Optionally, one or more intermediary 911 service providers 432 are used to facilitate the connection to the local PSAP 431. Call 403 may be completed using at least one of plain old telephone service, T1, VoIP protocols such as session initiation protocol (SIP), cellular signaling, and the like.

For example, when call 403 is terminated to local PSAP 431, call 403 is connected to announcement server 440, and announcement server 440 notifies 404 a PSAP operator associated with PSAP 430 that (automated) call 403 was initiated by a person at the provisioned service address.

For example, when call 403 is terminated to local PSAP 430, call 403 is connected 405 (directly) to provisioned user 450 through 406 a communication device or devices 180 using a call initiated by the processing entity to the user's preferred phone number; or using some other interactive communications mechanism (SMS, IM, video, smartphone application, or other communications mechanism) supported by communication device(s) 180 of 406 user 450.

For example, when call 403 is terminated to local PSAP 430, call 403 is connected 404 to announcement server 440 and additional calls 405 are placed sequentially or concurrently to a plurality of alternate telephone numbers associated with communication device(s) 180 of 406 user 450; or using some other interactive communications mechanism 406 (e.g., SMS, IM, video, smartphone application, or other communications mechanism) supported by communication device(s) 180 of user 450. The PSAP operator can talk to a live human to handle the emergent situation if the user is available, but still receives the notification via the server immediately even if the user does not answer.

For example, when call 403 is terminated to local PSAP 430, call 403 is connected 408 directly to provisioned user 450 using 409 consumer appliance device 110 in the structure with capability for voice, video, and/or instant messaging (IM) communication.

For example, when call 403 is terminated to local PSAP 430, call 403 is connected 404 to announcement server 440 while the system places additional calls 408 to telephone numbers associated with appliance device 110 of 409 user 450 in the structure with capability for voice, video, IM, or other form of communication. The PSAP operator can talk to a live human to handle the emergent situation if the user is available, but still receives the notification via the server immediately or if the user does not answer.

Figure 5:
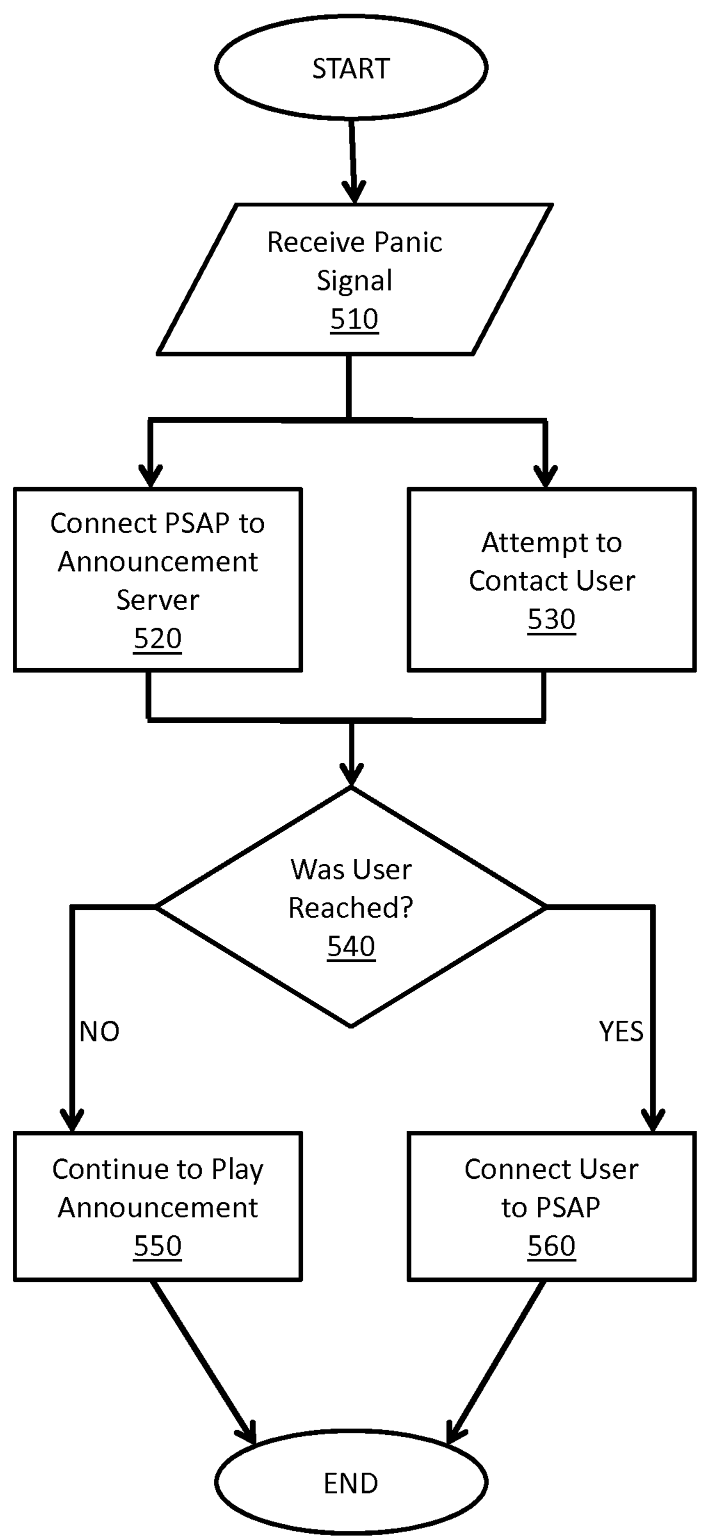
FIG. 5 is a simplified flow diagram of processing a panic button signal, according to various embodiments.

FIG. 5 depicts a simplified flow diagram for processing entity 410 processing a panic signal. An incoming panic signal is received (e.g., by processing entity 410) at step 510. At step 520, a call to the PSAP 430 is initiated, connecting an operator at PSAP 430 to announcement server 440, and in response to being connected an emergency announcement with the provisioned location information is provided. Concurrently at step 530 user 450 is contacted using one or more user communications devices 180. At step 540, whether the user has been reached through an interactive mechanism (e.g., voice, video, SMS, other interactive communications software, etc.) is determined. When the user is not reached within a predetermined period of time, the announcement continues to play for the PSAP operator at step 550. When the user is reached, the user is connected to the PSAP operator at step 560.

For example, processing entity 410, in response to receiving panic signal 401 through network 120 (and optionally at least one of security system 130, remote network application server 150, and local application server/multi-function base unit 160, shown in FIG. 1) sends a notification 407 to user 450 through 406 user communication device 180 (e.g., via a smartphone app, push notification, SMS message, phone call, email, or other mechanism). In this way, the user has an opportunity (e.g., with a time limit or password to ensure the user is not under duress) to prevent the 911 call from being placed in the case of a false alarm. When the user is unreachable or confirms the panic signal relates to a legitimate security event, the 911 call is placed to PSAP 430 as described above in relation to steps 403 and 404 of FIG. 4.

Figure 6:
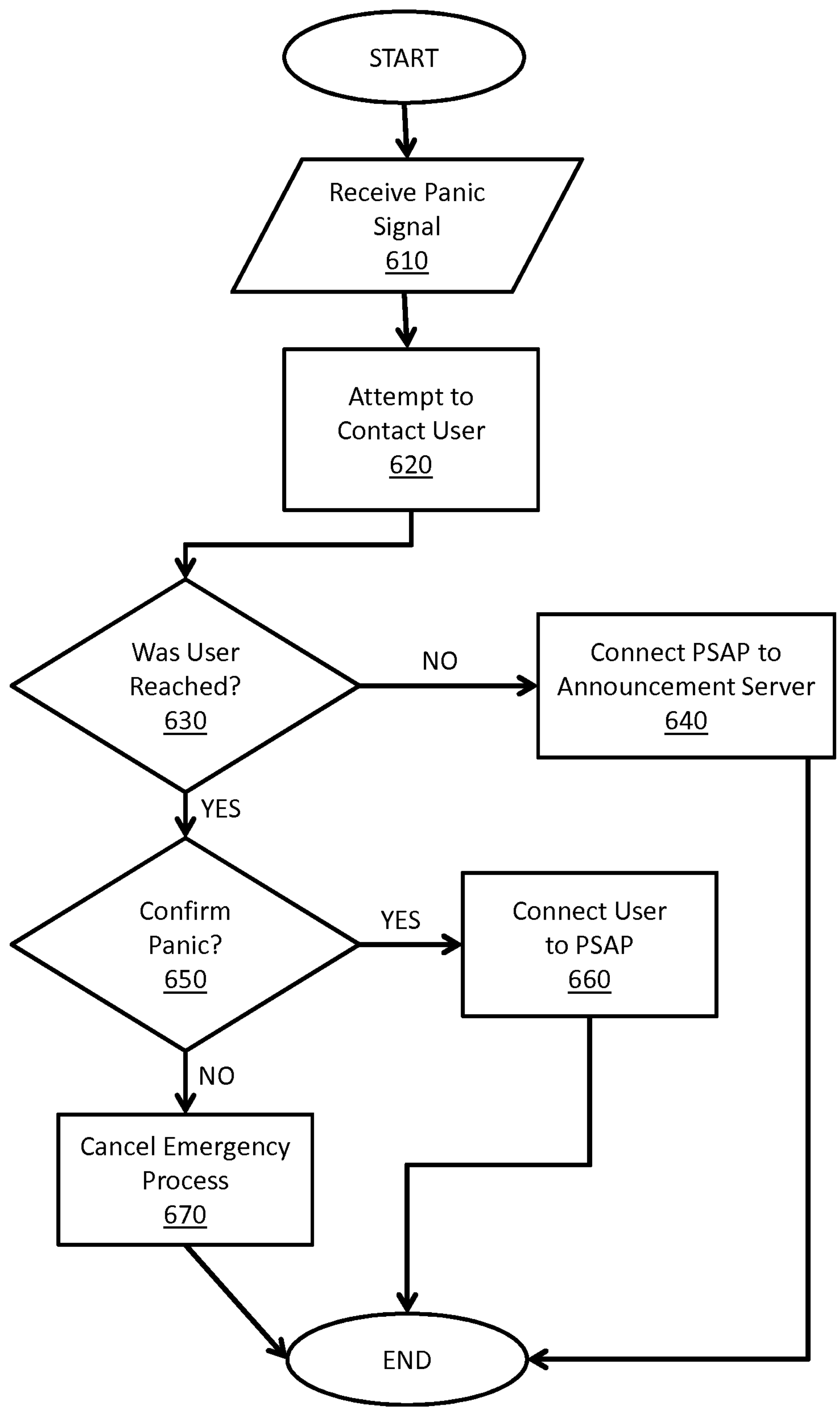
FIG. 6 is a simplified flow diagram of contacting a user, in accordance with several embodiments.

FIG. 6 shows a simplified flow diagram for processing entity 410 processing a panic signal. An incoming panic signal is received (e.g., by the processing entity) at step 610. At step 620 user 450 (not shown) is contacted using one or more of user communications devices 180 and appliance device 110 with voice, video, IM, or other communication capabilities. At step 630, the system waits a predetermined time to see if the user has been reached. If not, at step 640 a call is initiated to PSAP 430, connecting PSAP 430 to an announcement server 440 and playing the emergency announcement with the provisioned location information. In response to the user being reached, a mechanism is used to determine if the panic event is legitimate and if the user is under duress, at step 650. If the panic signal relates to a legitimate security event and the user is under duress, the processing entity initiates a call to PSAP 430 and the user is connected directly to PSAP 430, at step 660. In response to the user indicating the panic signal was a false alarm at step 650, the emergency process is canceled at step 670.

Providers of network-connected devices may also provide a remote software control mechanism, for example, smartphone application, web access, telephone touch-tone control, and the like. Such remote software control mechanisms may be useful for monitoring and controlling the appliance device 110 remotely (e.g., from the office, while on vacation, and the like). In various embodiments, the additional panic-button functionality of the consumer appliance device is also available through the remote software control mechanism. For example, the emergency infrastructure described above is used to allow such remote software control mechanisms to initiate emergency calls that appear as if they came from the service address of the monitored device (provisioned location), rather than the physical location of the smartphone running the application. The user 450 may be connected to and communicating with emergency services (e.g., PSAP) from a remote location using one or more user communications device (s), but it will appear to the emergency services personnel that the communication is originating from the structure.

For example, the remote software control mechanism may have the capability of issuing panic signals from the location of a smartphone (not illustrated in FIG. 6; e.g., located using at least one of GPS coordinates, WiFi location, cellular triangulation, and the like), and/or from the location of appliance device 110 being controlled (provisioned location). In this way, panic capabilities may be used to indicate a problem at the site of the consumer appliance device and/or at user's location.

A service connecting a caller to a PSAP with proper address information may be provided for a fee on a monthly basis. Such an expense can be several cents per month. Further, some municipalities charge a dollar or more per month in taxes/service fees for each customer of a telephone service capable of dialing 911. Given the potentially long operating life of appliance device 110 (e.g., a thermostat, remote control, and similar appliance in the home), the relatively low likelihood of an emergency event in any particular month, and the fact that appliance device 110 does not provide a regular phone service, this prohibitive expense should be avoided. In some embodiments, provisioning of the address for the triggering device is not done until an actual emergency event is established. Since provisioning may be performed electronically, such that there is no perceptible delay in the handling of a 911 call and costs associated with providing a phone number and ongoing 911 service, and associated government taxes/fees are avoided until the service is needed.

Figure 7:
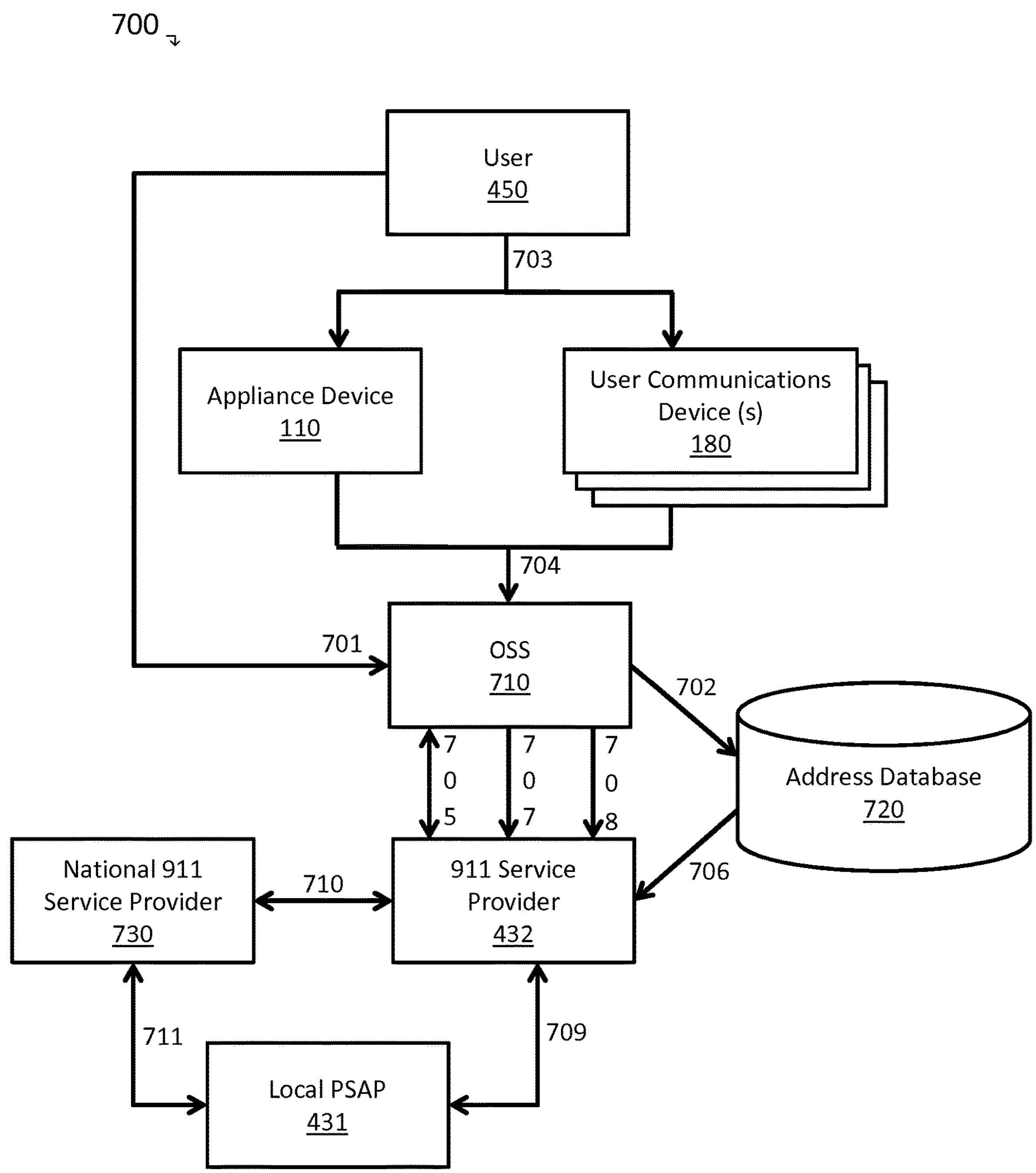
FIG. 7 is another simplified flow diagram of contacting a user, according to some embodiments of the present invention.

FIG. 7 illustrates a simplified block diagram for a system 700 for provisioning a user and his or her location on an as-needed basis with a 911 service provider.

Provisioning of addresses with a 911 service provider 432 (FIG. 4) may be provided using an application programming interface (API) used by the network operator's (e.g., organization producing appliance device 110) operations support system (OSS) 710 to communicate with the 911 service provider. When an end user 450 initially activates their consumer appliance device, they provide their service address as part of the activation process at step 701. OSS 710 may perform a variety of checks of the service address to ensure that it is valid and then stores it in address database 720, for future provisioning at step 702.

A panic signal may be triggered in response to user 450 pressing a button, shaking, striking, etc. the consumer appliance device 110, selecting an option via remote software control mechanism accessed by a user communication device 180, and the like, at path 703. When the end user generates their first panic signal, the panic signal is sent to the appliance device's OSS 710, at step 704. When this initial panic signal leading to their first call to 911 is received, an emergency call signal is sent to the 911 server which determines if the user's device has already been provisioned with 911 services at step 705. When the user is not provisioned, OSS server 710 retrieves a previously validated address from the database 720 at step 706 and submits the previously validated address to the 911 service provider's API at step 707.

In response to provisioning being confirmed, a 911 server portion of OSS 710 may send a control emergency call signal 708 to the 911 service provider asking it to initiate a 911 call. The 911 service provider, having the provisioned address of the device initiating the call, presents the provisional address 709 to the appropriate PSAP 431, and connects the call. The 911 server determines the appropriate call handling for the origination side of the call (e.g., connecting the call to an announcement server, to a user's pre-selected phone number, and the like).

When the provisioning fails, the address proves to be invalid (in spite of having been previously validated), etc., the 911 service provider may pass the call to a national center 730 at step 710 for proper routing to the appropriate PSAP at step 711.

Figure 8:
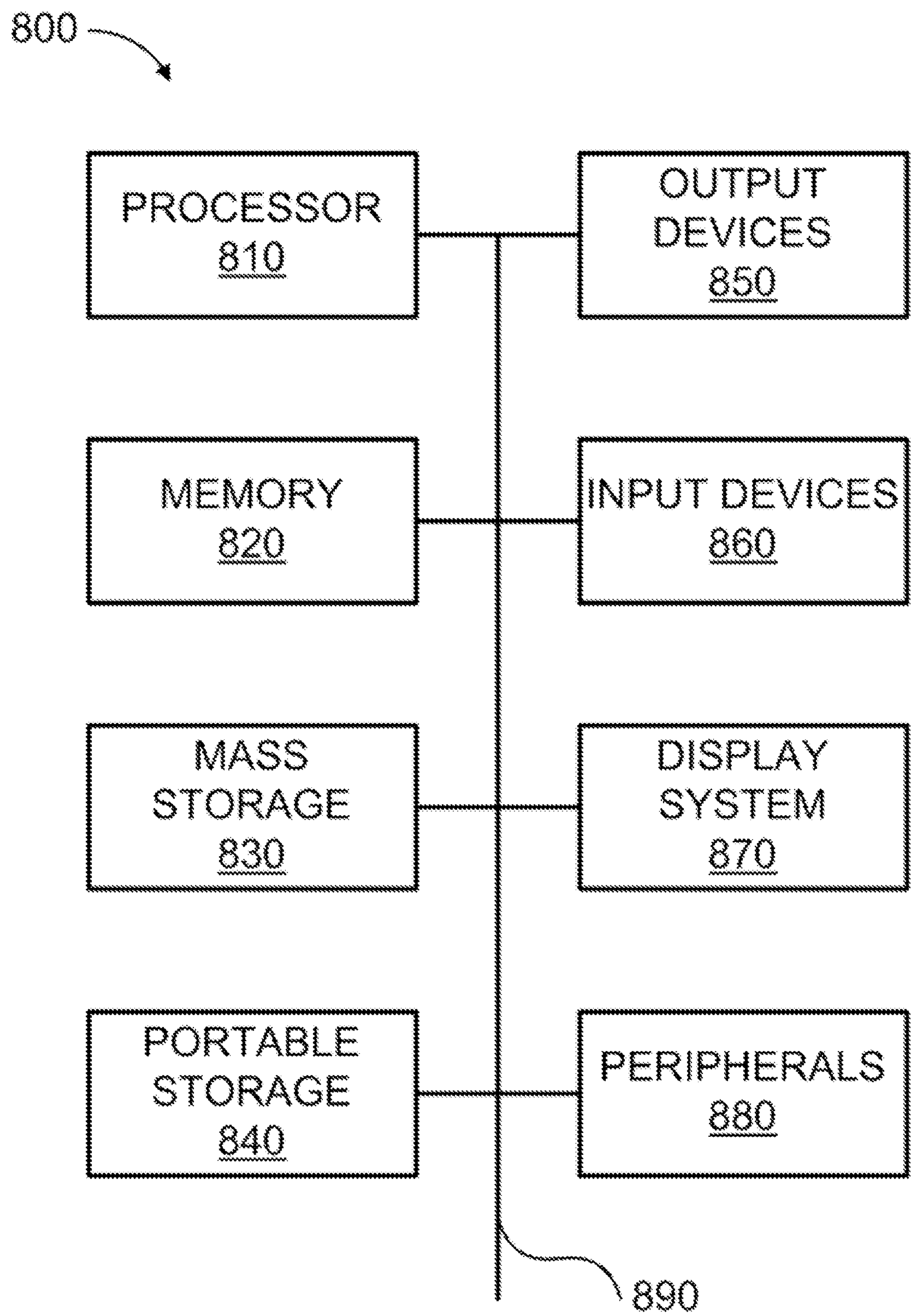
FIG. 8 is a simplified block diagram for a computing system according to some embodiments.

FIG. 8 illustrates an exemplary computing system 800 that is used to implement some embodiments of the present systems and methods. The computing system 800 of FIG. 8 is implemented in the contexts of the likes of computing devices, networks, webservers, databases, or combinations thereof. The computing device 800 of FIG. 8 includes a processor 810 and memory 820. Memory 820 stores, in part, instructions and data for execution by processor 810. Memory 820 stores the executable code when in operation. The computing system 800 of FIG. 8 further includes a mass storage 830, portable storage 840, output devices 850, input devices 860, a display system 870, and peripherals 880. The components shown in FIG. 8 are depicted as being connected via a single bus 890. The components are connected through one or more data transport means. Processor 810 and memory 820 may be connected via a local microprocessor bus, and the mass storage 830, peripherals 880, portable storage 840, and display system 870 may be connected via one or more input/output (I/O) buses.

Mass storage 830, which may be implemented with a magnetic disk drive, solid-state drive (SSD), or an optical disk drive, is a non-volatile storage device for storing data and instructions for use by processor 810. Mass storage 830 can store the system software for implementing embodiments of the present technology for purposes of loading that software into memory 820.

Portable storage 840 operates in conjunction with a portable non-volatile storage medium, such as a floppy disk, compact disk or digital video disc, to input and output data and code to and from the computing system 800 of FIG. 8. The system software for implementing embodiments of the present technology may be stored on such a portable medium and input to the computing system 800 via the portable storage 840.

Input devices 860 provide a portion of a user interface. Input devices 860 may include an alphanumeric keypad, such as a keyboard, for inputting alphanumeric and other information, or a pointing device, such as a mouse, a trackball, stylus, or cursor direction keys. Additionally, the system 800 as shown in FIG. 8 includes output devices 850. Suitable output devices include speakers, printers, network interfaces, and monitors.

Display system 870 includes a liquid crystal display (LCD) or other suitable display device. Display system 870 receives textual and graphical information, and processes the information for output to the display device.

Peripherals 880 include any type of computer support device to add additional functionality to the computing system. Peripherals 880 may include a modem or a router.

The components contained in the computing system 800 of FIG. 8 are those typically found in computing systems that may be suitable for use with embodiments of the present technology and are intended to represent a broad category of such computer components that are well known in the art. Thus, the computing system 800 can be a personal computer, hand held computing system, telephone, mobile phone, smartphone, tablet, phablet, wearable technology, mobile computing system, workstation, server, minicomputer, mainframe computer, or any other computing system. The computer can also include different bus configurations, networked platforms, multi-processor platforms, etc. Various operating systems can be used including UNIX, LINUX, WINDOWS, MACINTOSH OS, IOS, ANDROID, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 800 may be implemented as a cloud-based computing environment, such as a virtual machine operating within a computing cloud. In other embodiments, the computing system 800 may itself include a cloud-based computing environment, where the functionalities of the computing system 800 are executed in a distributed fashion. Thus, the computing system 800, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 800, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical, magnetic, and solid-state disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASH memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the present technology has been described in connection with a series of preferred embodiment, these descriptions are not intended to limit the scope of the technology to the particular forms set forth herein. It will be further understood that the methods of the technology are not necessarily limited to the discrete steps or the order of the steps described. To the contrary, the present descriptions are intended to cover such alternatives, modifications, and equivalents as may be included within the spirit and scope of the technology as defined by the appended claims and otherwise appreciated by one of ordinary skill in the art.

What is claimed is:

1. A method for notifying first responders of an emergency situation at a structure comprising:

receiving, by at least one of an appliance device located at the structure and a processing entity, an alarm indicating a presence of the emergency situation;

providing, by the at least one of the appliance device and the processing entity, a notification to a mobile device of a user, the notification including indicia of the emergency situation;

when a user confirmation of the emergency situation, in response to receiving the notification, is received by the at least one of the appliance device and the processing entity within a predetermined amount of time: initiating, by the at least one of the appliance device and the processing entity, first communications between the mobile device and a public-safety answering point (PSAP); and when the user confirmation of the emergency situation, in response to receiving the notification, is not received by the at least one of the appliance device and the processing entity within the predetermined amount of time: initiating, by the at least one of the appliance device and the processing entity, second communications between the PSAP and an announcement server to notify a PSAP operator associated with the PSAP an emergency announcement with a location associated with the structure, the second communications providing the location associated with the structure to the PSAP.

2. The method of claim 1 wherein the processing entity is at least one of a remote server box, a local server or multi-function base unit, an alarm system in the structure, and a remote monitoring service.

3. The method of claim 1 wherein the mobile device is one or more of a desktop computer, a notebook computer, a tablet computer, a phablet, and a smart phone, the mobile device using one or more applications for the notification and the user confirmation.

4. The method of claim 1 wherein the appliance device determines the presence of the emergency situation using one or more sensors, the one or more sensors sensing at least one of a panic indication from the user, smoke, a predetermined temperature greater than 117° F., and carbon monoxide.

5. The method of claim 1 wherein receiving the alarm, providing the notification, and receiving the user confirmation each use at least one of a short message service (SMS) text message, a push notification, an email, an audio message, a video message, plain old telephone service (POTS), T1, wireless broad band, and voice over internet protocol (VoIP) phone network.

6. The method of claim 1, wherein the appliance device is at least one of a thermostat, an intercom, a light switch, a door bell, a telephone handset, a garage door control system, and an environmental sensor incorporating a mechanism allowing the user to interact with the appliance device to indicate a panic situation.

7. The method of claim 1, wherein the structure is at least one of a commercial and a residential structure.

8. The method of claim 1, wherein at least one of the appliance device and the processing entity is communicatively coupled to the mobile device using at least one of a public computer network, the Internet, a local computer network, a wireless computer network, WiFi, a wired computer network, Bluetooth, ZigBee, ZWave, DECT, plain old telephone service, T1, Voice over IP (VoIP) phone network, a cellular network, and a proprietary network connection.

9. The method of claim 1, wherein the emergency situation is at least one of a door and/or window is open, an intruder is present, smoke is detected, water is detected, and carbon monoxide is detected.

10. The method of claim 1 wherein the processing entity is at least one of a cloud server, a cloud-based computing system, and a cloud-based monitoring service.

11. The method of claim 1, further comprising:

when receiving a user indication that the alarm is a false alarm by the at least one of the appliance device and the processing entity, canceling emergency process.

12. A system for notifying first responders of an emergency situation at a structure, the system comprising:

a processor; and a memory coupled to the processor, the memory storing instructions executable by the processor to perform a method comprising:

receiving, by at least one of an appliance device associated with the structure and a processing entity, an alarm indicating a presence of the emergency situation;

providing, by the at least one of the appliance device and the processing entity, a notification to a mobile device of a user, the notification including indicia of the emergency situation;

when a user confirmation of the emergency situation, in response to receiving the notification, is received by the at least one of the appliance device and the processing entity within a predetermined amount of time: initiating, by, the at least one of the appliance device and the processing entity, first communications between the mobile device and a public-safety answering point (PSAP); and when the user confirmation of the emergency situation, in response to receiving the notification, is not received by the at least one of the appliance device and the processing entity within the predetermined amount of time: initiating, by the at least one of the appliance device and the processing entity, second communications between the PSAP and an announcement server to notify a PSAP operator associated with the PSAP an emergency announcement with a location associated with the structure, the second communications providing the location associated with the structure to the PSAP.

13. The system of claim 12 wherein the processing entity is at least one of a remote server box, a local server or multi-function base unit, an alarm system in the structure, and a remote monitoring service.

14. The system of claim 12 wherein the mobile device is one or more of a desktop computer, a notebook computer, a tablet computer, a phablet, and a smart phone, the mobile device using one or more applications for the notification and the user confirmation.

15. The system of claim 12 wherein the appliance device determines the presence of the emergency situation using one or more sensors, the one or more sensors sensing at least one of a panic indication from the user, smoke, a predetermined temperature greater than 117° F., and carbon monoxide.

16. The system of claim 12 wherein receiving the alarm, providing the notification, and receiving the user confirmation each use at least one of a short message service (SMS) text message, a push notification, an email, an audio message, a video message, plain old telephone service (POTS), T1, wireless broad band, and voice over internet protocol (VoIP) phone network.

17. The system of claim 12, wherein the appliance device is at least one of a thermostat, an intercom, a light switch, a door bell, a telephone handset, a garage door control system, and an environmental sensor incorporating a mechanism allowing the user to interact with the appliance device to indicate a panic situation.

18. The system of claim 12, wherein at least one of the appliance device and the processing entity is communicatively coupled to the mobile device using at least one of a public computer network, the Internet, a local computer network, a wireless computer network, WiFi, a wired computer network, Bluetooth, ZigBee, ZWave, DECT, plain old telephone service, T1, Voice over IP (VoIP) phone network, a cellular network, and a proprietary network connection.

19. The system of claim 12, wherein the emergency situation is at least one of a door and/or window is open, an intruder is present, smoke is detected, water is detected, and carbon monoxide is detected.

20. The system of claim 12 wherein the processing entity is at least one of a cloud server, a cloud-based computing system, and a cloud-based monitoring service.

21. The system of claim 12 wherein the system comprises a cloud-based computing system.

22. A non-transitory, computer-readable storage medium having embodied thereon a program, the program being executable by a processor to perform a method for notifying first responders of an emergency situation at a structure, the method comprising:

receiving, by at least one of an appliance device associated with the structure and a processing entity, an alarm indicating a presence of the emergency situation;

providing, by the at least one of the appliance, device and the processing entity, a notification to a mobile device of a user, the notification including indicia of the emergency situation;

when a user confirmation of the emergency situation, in response to receiving the notification, is received by the at least one of the appliance device and the processing entity within a predetermined amount of time: initiating, by the at least one of the appliance device and the processing entity, first communications between the mobile device and a public-safety answering point (PSAP); and when the user confirmation of the emergency situation, in response to receiving the notification, is not received by the at least one of the appliance device and the processing entity within the predetermined amount of time: initiating, by the at least one of the appliance device and the processing entity, second communications between the PSAP and an announcement server to notify a PSAP operator associated with the PSAP an emergency announcement with a location associated with the structure, the second communications providing the location associated with the structure to the PSAP.

23. The non-transitory, computer-readable storage medium of claim 22 wherein the processing entity is at least one of a cloud server, a cloud-based computing system, and a cloud-based monitoring service.

* * * * *